United States Patent
Okada et al.

(10) Patent No.: US 6,239,695 B1
(45) Date of Patent: *May 29, 2001

(54) SEAT BELT WARNING DEVICE

(75) Inventors: Shoji Okada, Anjo; Yasuaki Suzuki, Kariya; Hitoshi Takayanagi, Chiryu, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/519,329

(22) Filed: Mar. 6, 2000

Related U.S. Application Data

(63) Continuation of application No. 09/143,119, filed on Aug. 28, 1998.

(30) Foreign Application Priority Data

Aug. 28, 1997 (JP) .................................................. 9-232813

(51) Int. Cl.$^7$ ...................................................... G08B 21/00
(52) U.S. Cl. ...................... 340/457.1; 340/626; 340/666; 340/667; 280/735; 280/732
(58) Field of Search ................................ 340/451.1, 626, 340/666, 667; 280/735, 732

(56) References Cited

U.S. PATENT DOCUMENTS

| | | | |
|---|---|---|---|
| 3,840,849 | * 10/1974 | Lohr | 340/52 E |
| 3,895,346 | 7/1975 | Assfour et al. | 340/52 E |
| 3,898,473 | 8/1975 | Ueda et al. | 307/105 B |
| 3,962,677 | * 6/1976 | Miesterfeld et al. | 340/52 E |
| 4,200,777 | 4/1980 | Miller | 200/85 R |
| 4,525,606 | 6/1985 | Sado | 200/5 R |
| 4,801,771 | 1/1989 | Mizuguchi et al. | 200/86 R |
| 4,849,733 | 7/1989 | Conigliaro et al. | 340/457.1 |
| 5,232,243 | 8/1993 | Blackburn et al. | 280/732 |
| 5,260,684 | * 11/1993 | Metzmaker | 340/457.1 |
| 5,474,327 | 12/1995 | Schousek | 280/735 |
| 5,570,903 | 11/1996 | Meister et al. | 280/735 |
| 5,573,269 | 11/1996 | Gentry et al. | 280/735 |
| 5,714,930 | 2/1998 | McKinney, Jr. | 340/468 |
| 5,796,059 | 8/1998 | Boon | 200/85 R |
| 5,871,232 | 2/1999 | White | 280/735 |
| 5,886,615 | 3/1999 | Burgess | 338/114 |
| 5,896,090 | 4/1999 | Okada et al. | 340/667 |
| 6,053,529 | * 4/2000 | Frusti et al. | 280/735 |
| 6,079,738 | * 6/2000 | Lotito et al. | 280/735 |

FOREIGN PATENT DOCUMENTS

| | | | |
|---|---|---|---|
| 2114504 | 10/1972 | (DE) . | |
| 2236061 | 2/1974 | (DE) . | |
| 4-41443 | 4/1992 | (JP) | B60R/22/48 |
| 2535120 | 6/1993 | (JP) | B60R/21/32 |
| 9-315199 | 12/1997 | (JP) . | |
| 94/01935 | 1/1994 | (WO) | H03K/17/96 |

* cited by examiner

*Primary Examiner*—Daniel J. Wu
*Assistant Examiner*—Tai T. Nguyen
(74) *Attorney, Agent, or Firm*—Burns, Doane, Swecker & Mathis, LLP

(57) ABSTRACT

A seat belt warning device includes a sitting detection switch which is adapted to be in an on-state when a person sits on a vehicle seat and in an off-state when a person is not sitting on the vehicle seat, and a fastening detection switch which is connected to the sitting detection switch in series and adapted to be in an on-state when a seat belt is not fastened and in an off-state when the seat belt is fastened. A warning member is connected to the sitting detection switch and the fastening detection switch in series and is supplied with electric current in the on-state of the sitting detection switch and the on-state of the fastening detection switch to issue a warning.

8 Claims, 3 Drawing Sheets

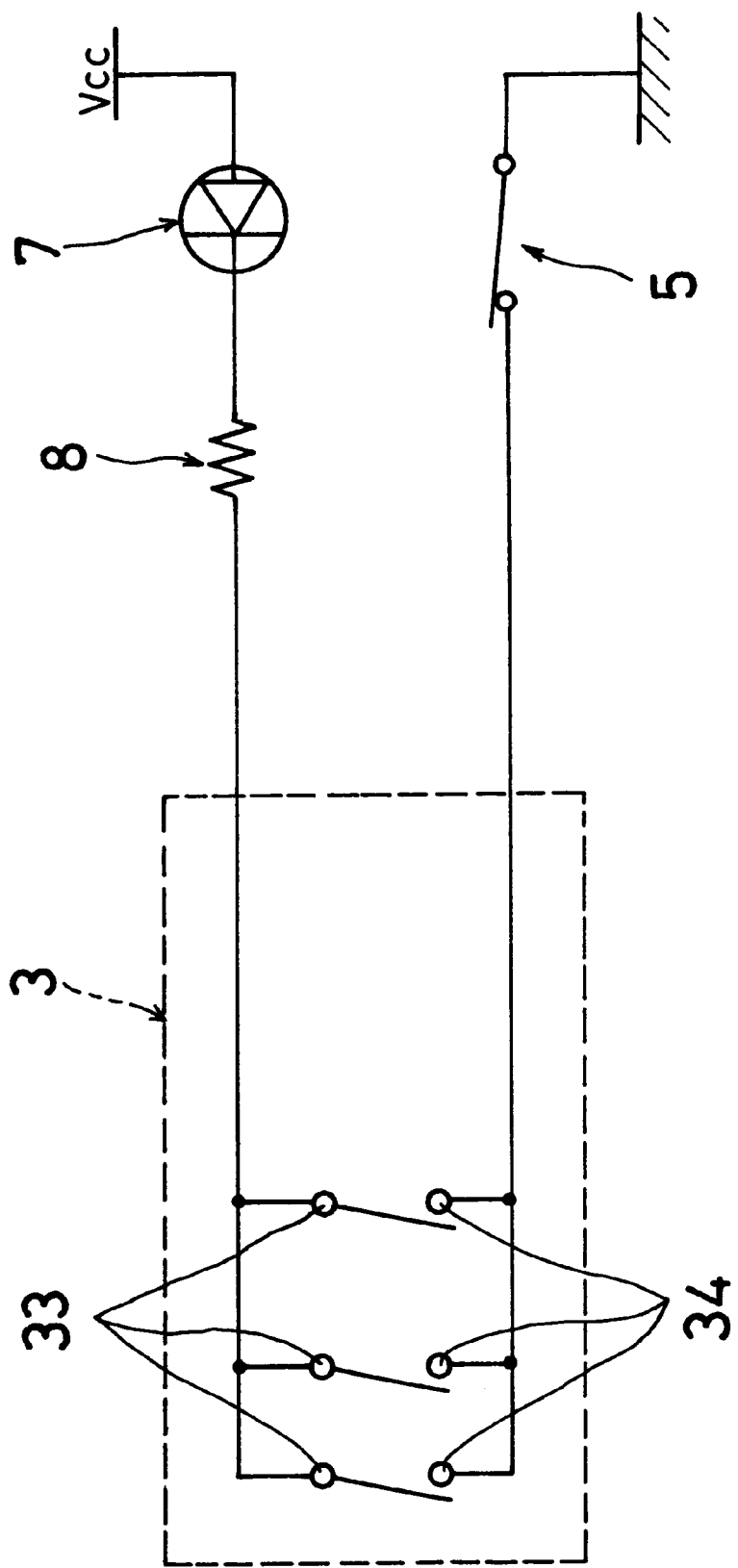

SEAT BELT WARNING DEVICE

This application is a continuation of application Ser. No. 09/143,119, filed Aug. 28, 1998.

This application corresponds to and claims priority under 35 U.S.C. § 119 with respect to Japanese Application No. 09(1997)-232813 filed on Aug. 28, 1997, the entire content of which is incorporated herein by reference.

FIELD OF THE INVENTION

The present invention generally relates to seat belts. More particularly, the present invention pertains to a seat belt warning device for detecting whether the seat belt is fastened or unfastened.

BACKGROUND OF THE INVENTION

A seat belt warning device for providing an indication of the fastened and unfastened states of a vehicle seat belt is described in Japanese Utility Model Unexamined Publication No. Hei. 4-41443. This device issues a warning when the ignition is in the on-state and the seat belt is in an unfastened state. Additionally, the detection of the fastening of the seat belt is inhibited when the opening and closing of the door is not detected.

However, in this type of seat belt warning device, because the detection of the fastening of the seat belt is based on the opening and closing of the door, as long as the door is not opened and closed, the device does not issue a warning, irrespective of the fastened or unfastened state of the seat belt. Thus, it is difficult to detect with certainty the fastened and unfastened state of the seat belt according to the existence of a person sitting in the vehicle seat. Particularly, in the case of detecting the fastened and unfastened state of a seat belt at the passenger seat, if the door is opened and closed, there is a fear that a warning is issued because of the unfastened state of the seat belt, although a person is not actually seated on the seat.

In light of the foregoing, a need exists for a seat belt warning device that is able to reliably detect the fastened and unfastened state of the seat belt based on whether an individual is seated on the vehicle seat.

SUMMARY OF THE INVENTION

According to one aspect of the invention, a seat belt warning device includes a sitting detection switch adapted to be in an on-state when a person sits and in an off-state when a person is not sitting, a fastening detection switch connected to the sitting detection switch in series and adapted to be in an on-state when a seat belt is not fastened and in an off-state when the seat belt is fastened, and a warning member connected to the sitting detection switch and the fastening detection switch in series and supplied with electric current in the on-state of the sitting detection switch and the on-state of the fastening detection switch to issue a warning.

According to another aspect of the present invention, a seat belt warning device includes a sitting detection switch provided on a vehicle passenger seat and adapted to detect a sitting state and a non-sitting state of the passenger seat, a fastening detection switch provided on a seat belt mechanism installed at the passenger seat and adapted to detect a use state and a non-use state of the seat belt mechanism, and a warning member provided at an instrument panel of the vehicle and operable based on signals from the sitting detection switch and the fastening detection switch.

In accordance with another aspect of the present invention, a seat belt warning device includes a sitting detection switch operatively associated with a vehicle seat and adapted to be in an on-state when a person is seated on the vehicle seat and in an off-state when a person is not seated on the vehicle seat a fastening detection switch connected to the sitting detection switch and adapted to be in an on-state when a seat belt is not fastened and in an off-state when the seat belt is fastened, and a warning member connected to the sitting detection switch and the fastening detection switch and adapted to issue a warning signal indicating that the seat belt is not fastened only when the sitting detection switch is in the on-state and the fastening detection switch is in the on-state.

According to the present invention, the operation of the warning member based on the fastening and unfastening detection of the fastening detection switch can be inhibited by the non-sitting detection of the sitting detection switch. Thus, the fastening and unfastening detection of the seat belt can be certainly carried out according to the existence of a person sitting on the vehicle seat.

BRIEF DESCRIPTION OF THE DRAWING FIGURES

Additional features and characteristics of the present invention will become more apparent from the following detailed description considered with reference to the accompanying drawing figures in which like elements are designated by like reference numerals and wherein:

FIG. 3 is a circuit diagram showing the seat belt warning device of the present invention.

DETAILED DESCRIPTION OF THE PREFERRED EMBODIMENTS

Figure 1:
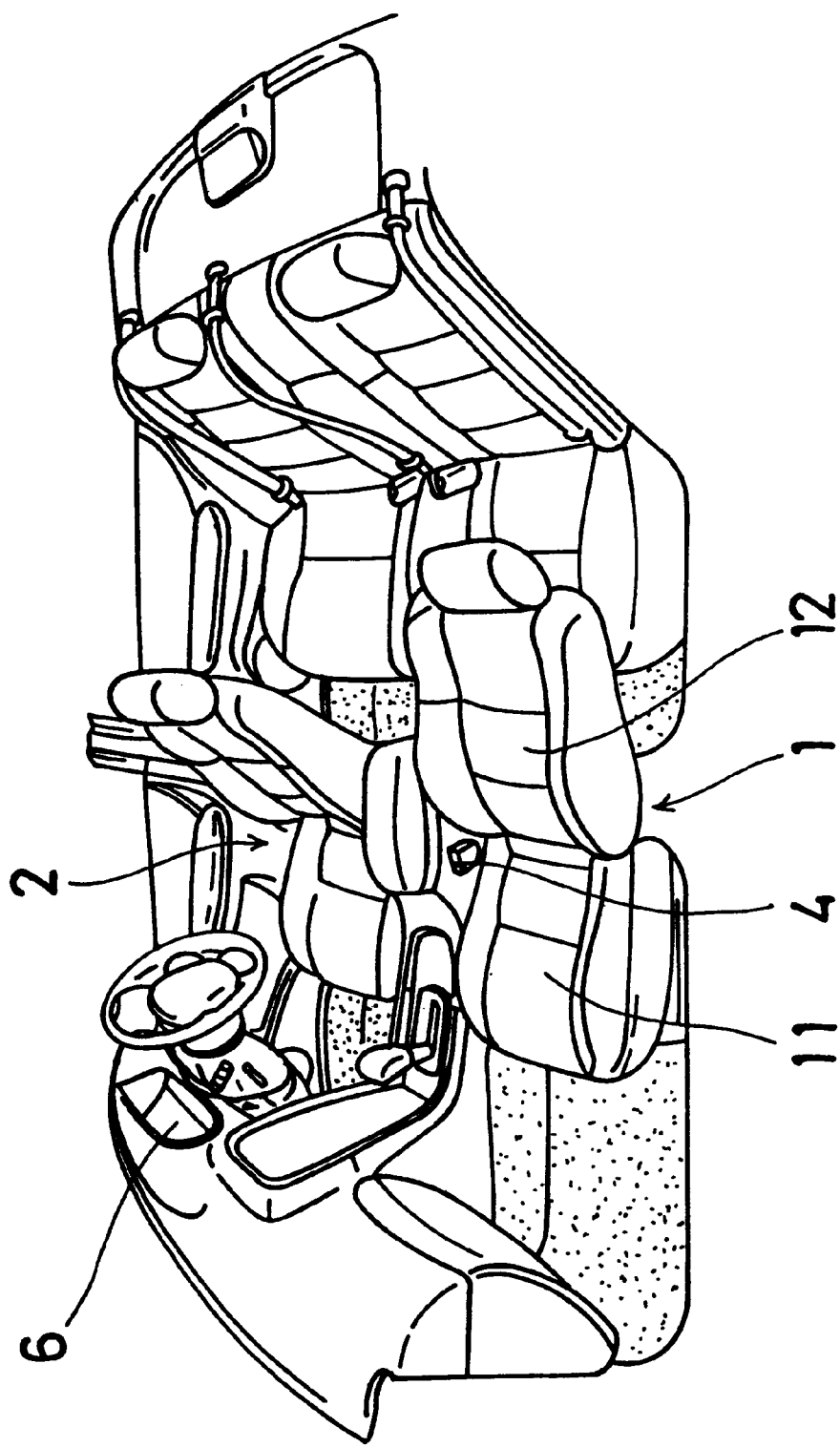
FIG. 1 is a perspective view showing the interior compartment of a vehicle provided with a seat in which a seat belt warning device of the present invention is employed.

As shown in FIG. 1, a passenger seat 1 and a driver's seat 2 are disposed side by side within the interior of the vehicle. The passenger seat 1 and the driver's seat 2 are provided with seat belt mechanisms for restraining persons sitting on the seats 1 and 2. A sitting detection switch 3 is provided for detecting a sitting state of the passenger seat 1, that is for detecting that a person is sitting in the seat. The sitting detection switch 3 is disposed in a rear portion, at the side of a seat back 12 of a seat cushion 11 of the passenger seat 1.

As seen in FIG. 3, a well known fastening detection switch 5 is provided for detecting the operation of the seat belt mechanism of the passenger seat 1. The fastening detection switch 5 detects whether or not the seat belt is fastened. The fastening detection switch 5 is disposed in a buckle 4 of the seat belt mechanism of the passenger seat 1. As flyer illustrated in FIG. 3, an indicator lamp 7 of a known type provides an indication of the unfastening of the seat belt mechanism of the passenger seat 1. This indicator lamp 7 is disposed in a display portion 6 of an instrument panel facing the driver's seat 1 of the vehicle.

Figure 2:
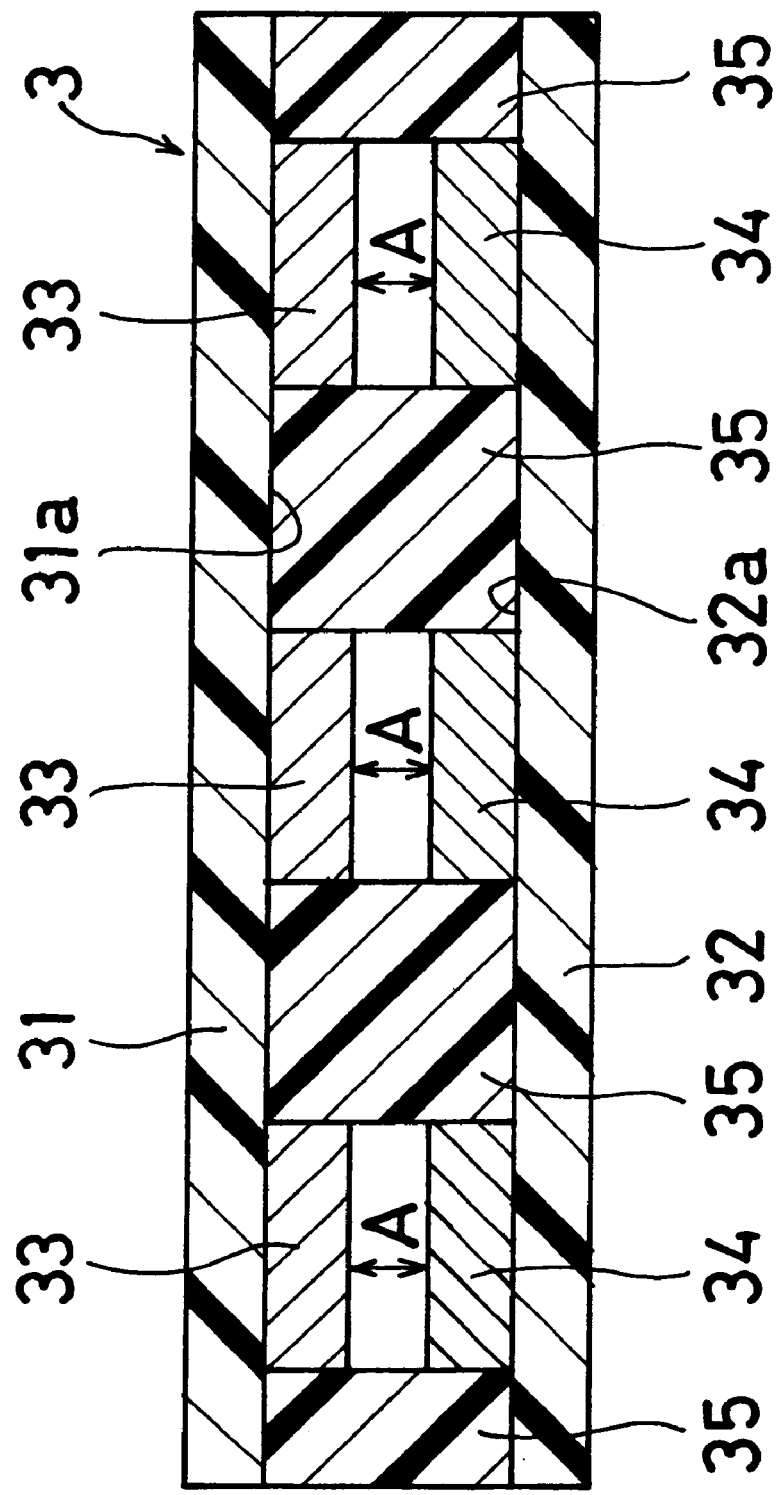
FIG. 2 is a cross-sectional view showing a sitting detection switch of the seat belt warning device of the present invention.

As shown in FIG. 2, the sitting detection switch 3 is a pressure sensitive switch, and includes a pair of films or film layers 31, 32, a plurality of first electrodes 33 and a plurality of second electrodes 34. The films 31, 32 are very thin resin films and exhibit the same planar lattice shape. The films 31, 32 overlap each other so that plane surfaces 31a, 32a are opposite to each other and face towards each other.

The first and second electrodes 33, 34 are disposed between the films 31, 32 so as to be positioned opposite to each other with a fixed interval A between the electrodes 33, 34. The electrodes 33, 34 are capable of coming into contact with each other. The set of first electrodes 33 is printed on the planar surface 31a of the one film 31, and the set of second electrodes 34 is printed on the planar surface 32a of the film 32. Adhesive members 35 each containing a resin spacer (not specifically shown) therein are disposed between the films 31, 32 at spaced apart locations. The adhesive members 35 are located between the adjacent pairs of first electrodes 33 and the adjacent pairs of second electrodes 34 so that the adhesive members 35 are positioned at portions where the first and second electrodes 33, 34 are not located. The films 31, 32 are bonded to one another by these adhesive members 35, with the first and second electrodes 33, 34 being disposed between the films 31, 32.

In the sitting detection switch 3 having the above-described structure, all of the electrodes 33, 34 are normally in the off-state by virtue of the interval A or spacing between the electrodes 33, 34. The first electrodes 33 are brought into contact with the second electrodes 34 by the application of a load that results by the sitting of a person on the passenger seat 1. When the first electrodes 33 are brought into contact with the second electrodes 34, the switch moves to an on-state or normally open position.

The features of the fastening detection switch 5 are well known. The switch 5 is normally in an on-state, and when the seat belt is fastened to the buckle 4, the switch 5 moves to an off-state or normally closed position. The indicator lamp 7 is also well known. The lamp 7 is tuned off in a non current-flowing state, and is turned on or repetitively turned on and off in a current-flowing state.

As shown in FIG. 3, the plurality of first electrodes 33 of the sitting detection switch 3 are connected to the indicator lamp 7 through a resistor 8, and the indicator lamp 7 is connected to a power source (battery) Vcc mounted on the vehicle. The plurality of second electrodes 34 of the sitting detection switch 3 are connected to the fastening detection switch 5, and the fastening detection switch 5 is grounded. The resistor 8 decreases the electric current flowing through the sitting detection switch 3, and functions as a protection mechanism for the sitting detection switch 3. As seen in FIG. 3, the fastening detection switch 5, the sitting detection switch 3 and the indicator lamp 3 are disposed in series.

The operation of the seat belt warning device of the present invention is as follows. Normally, in the case where a person is not sitting on the passenger seat 1, the seat belt mechanism does not function, that is the seat belt is not fastened. Thus, the fastening detection switch 5 is in the on-state. However, the sitting detection switch 3 is in the off-state, the indicator lamp 7 is not grounded and is not supplied with current from the power source Vcc and so the indicator lamp 7 is turned off. In this state, when a person sits on the passenger seat 1, the sitting detection switch 3 moves to the on-state as a result of the load applied by the person sitting on the seat. In this state, if the person sitting on the passenger seat 1 does not fasten the seat belt, the fastening detection switch 5 is maintained in the on-state. As a result, the indicator lamp 7 is grounded through the sitting detection switch 3 and the fastening detection switch 5, and the indicator lamp 7 is supplied with current from the power source Vcc. Thus, the indicator lamp 7 is turned on or repeatedly turned on and off. This warns the driver sitting in the driver's seat 2 that the person sitting in the passenger seat 1 has not fastened the seat belt. If the person sitting on the passenger seat 1 fastens the seat belt, the fastening detection switch 5 moves to the off-state. As a result, the indicator lamp is not grounded and so the indicator lamp 7 is turned off. The following Table 1 identifies the state of the indicator lamp 7 when the fastening detection switch 5 and the sitting detection switch 3 are in the on and off states.

TABLE 1

| | | Fastening detection switch 5 | |
|---|---|---|---|
| | | On (unfastening) | Off (fastening) |
| Sitting detection switch 3 | Off (non-sitting) | Turned off | Turned off |
| | On (sitting) | Turned on or turned on and off | Turned off |

Because the fastening and unfastening detection of the seat belt of the person sitting on the passenger seat 1 is determined based on the sitting state or the non-sitting state of the passenger seat 1 (i.e., whether or not a person is sitting in the passenger seat), the indicator lamp 7 is always turned off when a person is not sitting on the passenger seat 1. Thus, a driver sitting on the driver's seat 2 is not bothered. In the case where a person is sitting on the passenger seat 1, it is possible to reliably notify the driver sitting on the driver's seat 2 whether or not the person sitting on the passenger seat 1 has fastened the seat belt by turning on or repeatedly turning on and off the indicator lamp 7.

In the above-described embodiment, although the seat belt warning device of the present invention is adopted for the passenger seat 1, the device may be adopted for the driver's seat 2 or a rear seat. In this case, the indicator lamp 7 may be made common by controlling the on and off signals from the sitting detection switches and fastening detection switches of the respective seats by a microcomputer or the like. Of course, in the foregoing embodiment, the sitting detection switch 3, the fastening detection switch 5, and the indicator lamp 7 can also be controlled by using a microcomputer or the like.

According to the present invention, the seat belt warning device includes the sitting detection switch for detecting whether or not an individual is sitting on the seat (i.e., the sitting state and non-sitting state), and the detection of the fastening and unfastening of a seat belt of a person sitting in the seat is allowed or inhibited according to the sitting state or non-sitting state of the seat. That is, as long as the sitting detection switch indicates that an individual is not sitting in the seat, the detection of the fastened condition of the seat belt is not possible or is inhibited. Thus, the fastening and unfastening detection of the seat belt is certainly carried out according to the existence of a person sitting in the seat.

The principles, a preferred embodiment and the mode of operation of the present invention have been described in the foregoing specification. However, the invention which is intended to be protected is not to be construed as limited to the particular embodiment described. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A seat belt warning device, comprising:

a sitting detection switch adapted to be in an on-state when a person sits and in an off-state when a person is not sitting, said sitting detection switch including a set of first electrodes disposed on a first film layer, a set of second electrodes disposed on a second film layer, and a set of adhesive members located between adjacent pairs of the first electrodes and adjacent pairs of the second electrodes and contacting both the first and second film layers;

a fastening detection switch connected to the sitting detection switch in series, and adapted to be in an on-state when a seat belt is not fastened and in an off-state when the seat belt is fastened; and a warning member connected to the sitting detection switch and the fastening detection switch in series and supplied with electric current in the on-state of the sitting detection switch and the on-state of the fastening detection switch to issue a warning.

2. The seat belt warning device as claimed in claim 1, wherein the sitting detection switch is incorporated in a passenger seat of a vehicle and detects when a person is sitting in the passenger seat and when a person is not sitting in the passenger seat.

3. The seat belt warning device as claimed in claim 1, wherein the warning member is disposed in an instrument panel of a vehicle for issuing the warning to a driver of the vehicle.

4. A seat belt warning device, comprising:

a sitting detection switch provided on a vehicle passenger seat and adapted to detect a sitting state and a non-sitting state of the passenger seat, said sitting detection switch including a set of first electrodes disposed on a first film layer, a set of second electrodes disposed on a second film layer, and a set of adhesive members located between adjacent pairs of the first electrodes and adjacent pairs of the second electrodes and contacting both the first and second film layers;

a fastening detection switch provided on a seat belt mechanism installed at the passenger seat and adapted to detect a use state and a non-use state of the seat belt mechanism; and a warning member provided at an instrument panel of the vehicle and operable based on signals from the sitting detection switch and the fastening detection switch.

5. A seat belt warning device, comprising:

a sitting detection switch operatively associated with a vehicle seat and adapted to be in an on-state when a person is seated on the vehicle seat and in an off-state when a person is not seated on the vehicle seat, said sitting detection switch including a set of first electrodes disposed on a first film layer, a set of second electrodes disposed on a second film layer, and a set of adhesive members located between adjacent pairs of the first electrodes and adjacent pairs of the second electrodes and contacting both the first and second film layers;

a fastening detection switch connected to the sitting detection switch and adapted to be in an on-state when a seat belt is not fastened and in an off-state when the seat belt is fastened; and a warning member connected to the sitting detection switch and the fastening detection switch and adapted to issue a warning signal indicating that the seat belt is not fastened only when the sitting detection switch is in the on-state and the fastening detection switch is in the on-state.

6. The seat belt warning device as claimed in claim 5, wherein the warning member is disposed in an instrument panel of a vehicle for issuing the warning to a driver of the vehicle.

7. The seat belt warning device as claimed in claim 5, wherein the warning member is supplied with electric current only when the sitting detection switch is in the on-state and the fastening detection switch is in the on-state.

8. The seat belt warning device as claimed in claim 5, wherein the sitting detection switch, the fastening detection switch and the warning member are disposed in series.

* * * * *